(12) United States Patent
Watanabe et al.

(10) Patent No.: US 12,279,067 B2
(45) Date of Patent: Apr. 15, 2025

(54) PROCESSING SYSTEM AND PROCESSING METHOD OF IMAGE DATA

(71) Applicant: TOYOTA JIDOSHA KABUSHIKI KAISHA, Toyota (JP)

(72) Inventors: Toshinobu Watanabe, Tokyo-to (JP); Rio Suda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 201 days.

(21) Appl. No.: 18/091,764

(22) Filed: Dec. 30, 2022

(65) Prior Publication Data
US 2023/0262190 A1 Aug. 17, 2023

(30) Foreign Application Priority Data
Feb. 15, 2022 (JP) ................. 2022-021582

(51) Int. Cl.
*H04N 5/265* (2006.01)
*H04N 5/262* (2006.01)

(52) U.S. Cl.
CPC ........... *H04N 5/265* (2013.01); *H04N 5/2628* (2013.01)

(58) Field of Classification Search
CPC ...... H04N 5/265; H04N 5/2528; H04N 5/272; H04N 23/90; H04N 1/3872
See application file for complete search history.

(56) References Cited

U.S. PATENT DOCUMENTS

| | | | |
|---|---|---|---|
| 2009/0201424 A1 | 8/2009 | Ueda | |
| 2014/0354610 A1* | 12/2014 | Hosoda | H04N 13/398 345/204 |
| 2018/0217590 A1 | 8/2018 | Kobayashi et al. | |
| 2019/0047590 A1* | 2/2019 | Endo | G09G 3/2096 |
| 2020/0041992 A1* | 2/2020 | Nagashima | G06F 3/04847 |
| 2020/0186730 A1* | 6/2020 | Sakurada | H04N 23/90 |
| 2022/0176983 A1* | 6/2022 | Kakeda | B60W 50/14 |

FOREIGN PATENT DOCUMENTS

| | | |
|---|---|---|
| EP | 1748335 A2 | 1/2007 |
| JP | 2007-031102 A | 2/2007 |
| JP | 2009-094879 A | 4/2009 |
| JP | 2009-188800 A | 8/2009 |
| JP | 2010-025797 A | 2/2010 |
| JP | 2011-009823 A | 1/2011 |
| JP | 2014-150299 A | 8/2014 |
| JP | 2018-121267 A | 8/2018 |
| JP | 2020-047972 A | 3/2020 |

* cited by examiner

*Primary Examiner* — Said Broome
*Assistant Examiner* — Andrew Shin
(74) *Attorney, Agent, or Firm* — Sughrue Mion, PLLC

(57) ABSTRACT

A processor of a first terminal generates composite image data, in which main and sub image data are composited together, based on the main image data, the sub image data, and data about layout of a screen of a second terminal. The main image data are image data which are obtained by a main camera and are to be displayed on a main screen of a display of the second terminal. The sub image data are image data which are obtained by a sub camera and are to be displayed on a sub-screen of the display. A processor of the first terminal transmits the composite image data from the first terminal to the second terminal. A processor of the second terminal displays the composite image data received from the first terminal on the display.

6 Claims, 15 Drawing Sheets

FIRST EMBODIMENT

SECOND EMBODIMENT

EXAMPLE 1:
STOP JOINING
IMG_S

EXAMPLE 2:
CHANGE POSITION
OF AR_S

EXAMPLE 3:
SHRINK AREA
OF AR_S

PROCESSING SYSTEM AND PROCESSING METHOD OF IMAGE DATA

PROCESSING SYSTEM AND PROCESSING METHOD OF IMAGE DATA

The present disclosure claims priority under 35 U.S.C. § 119 to Japanese Patent Application No. 2021-21582, filed on Feb. 15, 2022, the contents of which application are incorporated herein by reference in their entirety.

TECHNICAL FIELD

The present disclosure relates to a system and a method of processing image data transmitted from a first terminal to a second terminal.

BACKGROUND

JP 2014-150299 A discloses a system in which two kinds of image data transmitted from a first terminal to a second terminal via a network are respectively displayed on a main screen and a sub-screen of a display of the second terminal. In the system in the prior art, position information of the sub-screen in the main screen is transmitted from the second terminal to the first terminal. The first terminal performs image processing to fill, with a single color, a specific region in an image for the main screen based on the position information. Then, the first terminal transmits a data set of image data for the sub-screen and image data for the main screen, resulting from the image processing, to the second terminal. The second terminal performs a picture-in-picture processing (PiP processing) by using the data set and superimposes an image for the sub-screen in a specific region. Image data resulting from the PiP processing are displayed on the display of the second terminal.

In the above system in the prior art, a specific region in an image for a main screen is filled in an image processing in a first terminal. Thus, compared to a case where two kinds of image data for the main screen and the sub-screen are transmitted without any change, a data amount to be transmitted can be reduced. However, because two kinds of image data are transmitted, when the data amount of one kind of image data becomes large, transmission at a designated frame rate becomes difficult. Consequently, when image data for the main screen and the sub-screen are displayed on a display of the second terminal, it is desired to make an improvement for further reduction in the data amount to be transmitted from the first terminal to the second terminal.

One object of the present disclosure is to provide a technique that can reduce a data amount to be transmitted from a first terminal to a second terminal when image data for a main screen and a sub-screen are displayed on a display of the second terminal.

SUMMARY

A first aspect of the present disclosure provides an image data processing system causing image data transmitted from a first terminal to a second terminal via a network to be displayed on a display of the second terminal, the image data processing system including the following features.

The first terminal includes a data processing device and a communication device which communicates with the second terminal. The data processing device of the first terminal includes a memory, which stores main image data which are obtained by a main camera and are to be displayed on a main screen of the display and sub image data which are obtained by a sub camera and are to be displayed on a sub-screen of the display, and a processor.

The second terminal includes a data processing device and a communication device which communicates with the first terminal. The data processing device of the second terminal includes a memory, which stores data about layout of a screen of the second terminal, and a processor.

The processor of the first terminal is configured to:
execute a data synthesizing processing to generate composite image data, in which the main and sub image data are composited together, based on the main and sub image data and the data about the layout which are received from the second terminal; and
a data transmission processing to transmit the composite image data to the second terminal.

The processor of the second terminal is configured to execute display control processing to display on the display the composite image data received from the first terminal.

A second aspect of the present disclosure further includes the following features in the first aspect.

The processor of the first terminal is further configured to execute object recognition processing to recognize an object in a periphery of the first terminal based on the main image data.

In the data synthesizing processing, the processor of the first terminal is further configured to:
determine whether or not a dynamic object recognized in the object recognition processing is positioned in a predetermined region in a main image to which the sub image data are planned to be joined; and
execute data adjustment processing to visualize the dynamic object when it is determined that the dynamic object is positioned in the predetermined region.

A third aspect of the present disclosure further includes the following features in the second aspect.

The data adjustment processing includes a stop of joining of the sub image data, change in a position of the predetermined region, and shrinking of a size of the predetermined region.

A fourth aspect of the present disclosure further includes the following features in the first aspect.

The first terminal further includes a data base that stores additional image data which are set while being associated with a moving situation of the first terminal.

The memory of the first terminal further stores data about the moving situation.

In the data synthesizing processing, the processor of the first terminal is further configured to:
extract the additional image data corresponding to the moving situation by referring to the data base based on the data about the moving situation; and
superimpose the additional image data corresponding to the moving situation on the main image data.

A fifth aspect of the present disclosure further includes the following features in the fourth aspect.

In the data synthesizing processing, the processor of the first terminal is configured to superimpose the additional image data on a region other than a predetermined region in a main image to which the sub image data are planned to be joined.

A sixth aspect of the present disclosure further includes the following features in the first aspect.

The first terminal is a terminal of a moving body on which the main and sub cameras are mounted.

The second terminal is a terminal for performing remote assistance for the moving body.

A seventh aspect of the present disclosure provides an image data processing method of causing image data transmitted from a first terminal to a second terminal via a network to be displayed on a display of the second terminal.

The image data processing method comprising the steps of:
  the first terminal generating composite image data, in which main and sub image data are composited together, based on the main image data which are obtained by a main camera and are to be displayed on a main screen of the display, the sub image data which are obtained by a sub camera and are to be displayed on a sub-screen of the display, and data about layout of a screen of the second terminal;
  the first terminal transmitting the composite image data to the second terminal; and
  the second terminal displaying the composite image data received from the first terminal on the display.

An eighth aspect of the present disclosure further includes the following features in the seventh aspect.

The image data processing method further comprising the steps of:
  the first terminal recognizing an object in a periphery of the first terminal based on the main image data;
  the first terminal determining whether or not a dynamic object recognized in the step of recognizing an object in the periphery of the first terminal is positioned in a predetermined region in a main image to which the sub image data are planned to be joined; and
  the first terminal executing data adjustment processing to not synthesize the sub image data with the predetermined region when it is determined that the dynamic object is positioned in the predetermined region.

A ninth aspect of the present disclosure further includes the following features in the eighth aspect.

The data adjustment processing includes a stop of joining of the sub image data, change in a position of the predetermined region, and shrinking of a size of the predetermined region.

A tenth aspect of the present disclosure further includes the following features in the seventh aspect.

The first terminal is a terminal of a moving body on which the main and sub cameras are mounted.

The second terminal is a terminal for performing remote assistance for the moving body.

According to the first or seventh aspect, the first terminal executes the processing (data synthesizing processing) to synthesize the main image data with the sub image data and the processing (data transmission processing) to transmit the composite image data to the second terminal. Consequently, compared to a case where the main image data and the sub image data are transmitted to the second terminal without any change, it becomes possible to reduce a data amount of image data to be transmitted from the first terminal to the second terminal.

According to the second or eighth aspect, when a dynamic object is recognized in the object recognition processing performed based on the main image data, it is determined whether or not the dynamic object is positioned in the predetermined region in the main image to which the sub image data are planned to be joined. Then, when it is determined that the dynamic object is positioned in the predetermined region, the data adjustment processing is executed to visualize the dynamic object. Consequently, when the dynamic object is positioned in the predetermined region in the main image, it becomes possible to avoid trouble that the dynamic object does not appear on the composite image.

According to the third or ninth aspect, by a stop of joining of the sub image data to the main image data, change in the position of the predetermined region, and shrinking of the size of the predetermined region, it becomes possible to avoid trouble that the dynamic object does not appear on the composite image.

According to the fourth aspect, in the data synthesizing processing, the additional image data which are set while being associated with the moving situation of the first terminal can be superimposed on the main image data. Consequently, when augmented reality information is displayed on the display, it becomes possible to reduce the data amount to be transmitted from the first terminal to the second terminal.

According to the fifth aspect, in the data synthesizing processing, the additional image data can be superimposed on a region other than the predetermined region in the main image to which the sub image data are planned to be joined. Consequently, when an additional image is superimposed on the main image, it becomes possible to avoid trouble that a sub image does not appear due to the additional image.

According to the sixth or tenth aspect, when the remote assistance for the moving body is executed by the first and second terminal, it becomes possible to reduce the data amount of image data to be transmitted from the first terminal to the second terminal.

DESCRIPTION OF EMBODIMENT

Figure 1:
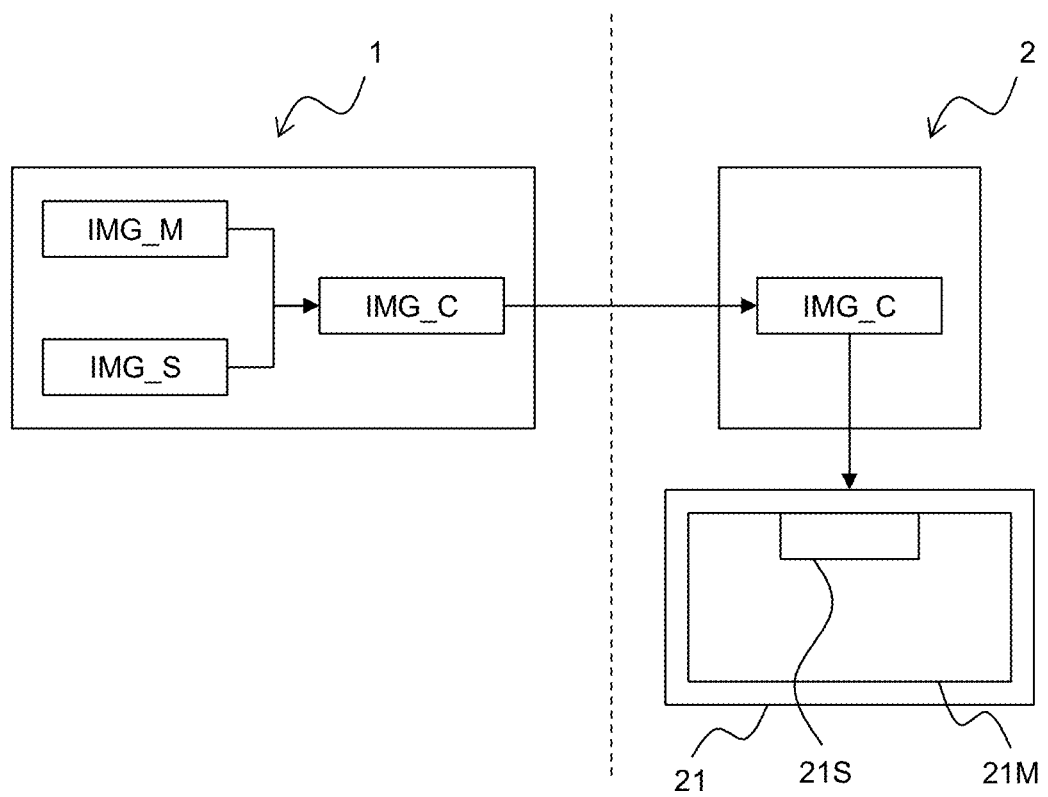
FIG. 1 is a diagram for explaining an outline of a processing example of image data which is executed in a first embodiment of the present disclosure.

Processing systems and processing methods of image data according to embodiments of the present disclosure will hereinafter be described with reference to drawings. Note that the processing methods according to the embodiments are realized by computer processing to be executed in the processing systems according to the embodiments. Further, the same reference characters are given to the same or corresponding components in the drawings, and descriptions thereof will be simplified or will not be repeated.

1. First Embodiment

A first embodiment of the present disclosure will be described with reference to FIGS. 1 to 8.

1-1. Outline of First Embodiment

Figure 2:
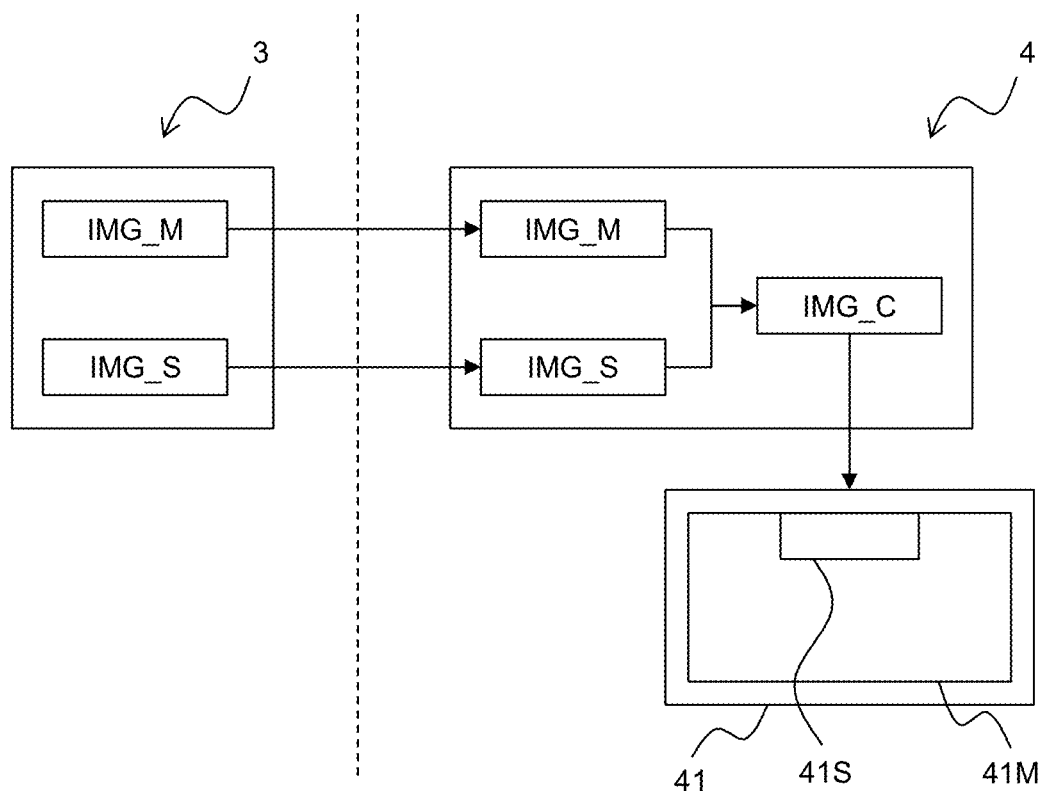
FIG. 2 is a diagram for explaining a processing example in prior art which is compared to the processing example of the first embodiment.

FIG. 1 is a diagram for explaining an outline of a processing example of image data which is executed in the first embodiment. FIG. 2 is a diagram for explaining a processing example in prior art which is compared to the processing example of the first embodiment.

FIG. 1 illustrates a first terminal 1 and a second terminal 2. The first terminal 1 communicates with the second terminal 2 via a network (not illustrated). In the example illustrated in FIG. 1, as data to be transmitted from the first terminal 1 to the second terminal 2, composite image data IMG_C are illustrated. The composite image data IMG_C are image data that can be obtained by compositing together main image data IMG_M and sub image data IMG_S which are obtained at the same time. The main image data IMG_M are image data obtained by a main camera. The sub image data IMG_S are image data obtained by a sub camera. The main camera and the sub camera may be mounted on the first terminal or may be mounted on an external device which is capable of communicating with the first terminal.

The composite image data IMG_C transmitted from the first terminal 1 to the second terminal 2 are displayed on a display 21 of the second terminal 2. The display 21 is divided into a main screen 21M and a sub-screen 21S. In the example illustrated in FIG. 1, the sub-screen 21S is a quadrangular region positioned in an upper center of the display 21. In a display region of the sub-screen 21S, image data corresponding to the sub image data IMG_S of the composite image data IMG_C are displayed. Meanwhile, in a display region of the main screen 21M, image data are displayed in which the image data corresponding to the display region of the sub-screen 21S are removed from the main image data IMG_M of the composite image data IMG_C.

Similarly to FIG. 1, FIG. 2 illustrates a first terminal 3 which communicates with a second terminal 4 via a network. In a processing example of the prior art which is illustrated in FIG. 2, as data to be transmitted from the first terminal 3 to the second terminal 4, the main image data IMG_M and the sub image data IMG_S are illustrated. In other words, in the processing example of the prior art, the main image data IMG_M and the sub image data IMG_S are transmitted to the second terminal 4 without any change.

In the processing example of the prior art, the second terminal 4 which receives the main image data IMG_M and the sub image data IMG_S generates the composite image data IMG_C. Generation of the composite image data IMG_C is executed by a PiP processing, for example. The composite image data IMG_C generated by the PiP processing are displayed on a display 41 of the second terminal 4. In a display region of a sub-screen 41S of the display 41, image data corresponding to the sub image data IMG_S are displayed. Meanwhile, in a display region of a main screen 41M, image data are displayed in which the image data corresponding to the display region of the sub-screen 41S are removed from the main image data IMG_M.

A large difference between the processing example of the first embodiment and that in the prior art is the terminal in which the composite image data IMG_C are generated. That is, in the former, the terminal on a transmission side (in other words, the first terminal 1) generates the composite image data IMG_C, but in the latter, the terminal on a reception side (in other words, the second terminal 4) generates the composite image data IMG_C. In the former, such a difference makes it possible to reduce the data amount to be transmitted from the first terminal 1 to the second terminal 2.

In the following, a description will be made about a processing system according to the first embodiment.

1-2. Processing System 1-2-1. Configuration Example

Figure 3:
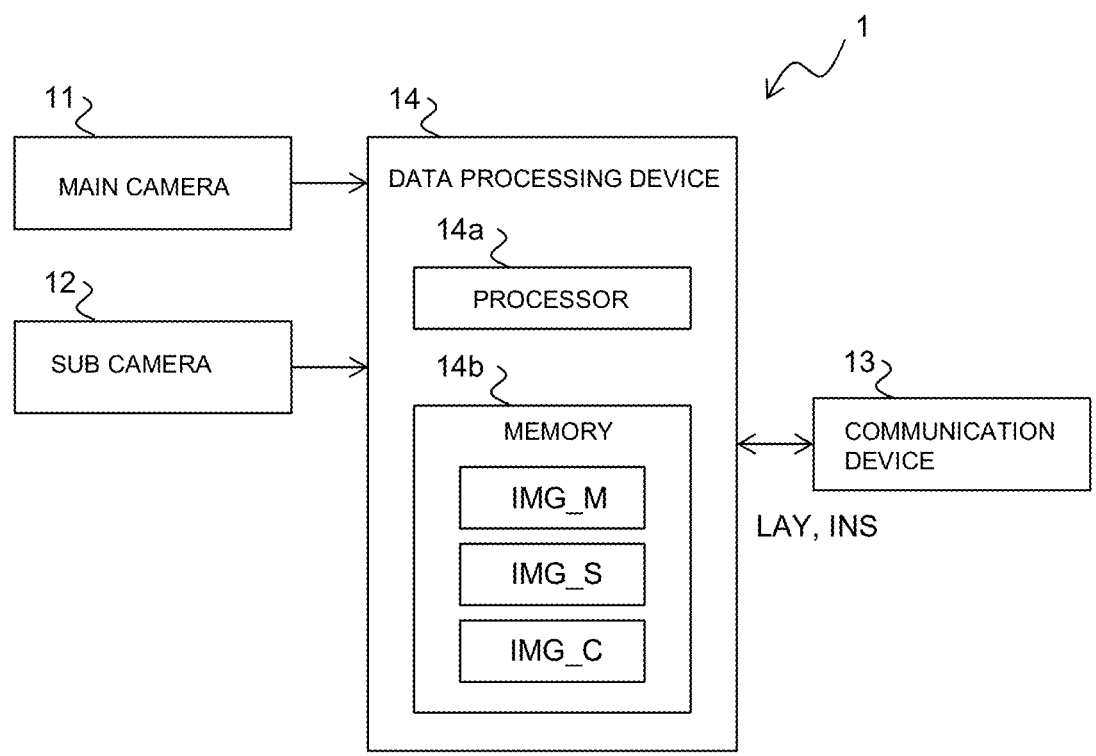
FIG. 3 is a block diagram illustrating a configuration example of a first terminal in the first embodiment.

A description will be made about a configuration example of the processing system according to the first embodiment with reference to FIGS. 3 to 5. FIG. 3 is a block diagram illustrating a configuration example of the first terminal 1 in the first embodiment. As illustrated in FIG. 3, the first terminal 1 includes a main camera 11, a sub camera 12, a communication device 13, and a data processing device 14. Configuration elements such as the main camera 11 are connected with the data processing device 14 by a predetermined network.

The main camera 11 is a camera for obtaining the main image data IMG_M. The sub camera 12 is a camera for obtaining the sub image data IMG_S. The main camera 11 transmits the obtained main image data IMG_M to the data processing device 14. The sub camera 12 transmits the obtained sub image data IMG_S to the data processing device 14.

The numbers of main cameras 11 and sub cameras 12 are not particularly limited, and one camera may be provided, or two or more cameras may be provided. FIG. 4 is a diagram for explaining examples of the main camera 11 and the sub camera 12. In the example illustrated in FIG. 4, main cameras 11A to 11C and sub cameras 12A to 12C are mounted on a moving body MV. The moving body MV is one example of an external device which is capable of communicating with the first terminal 1.

Figure 4:
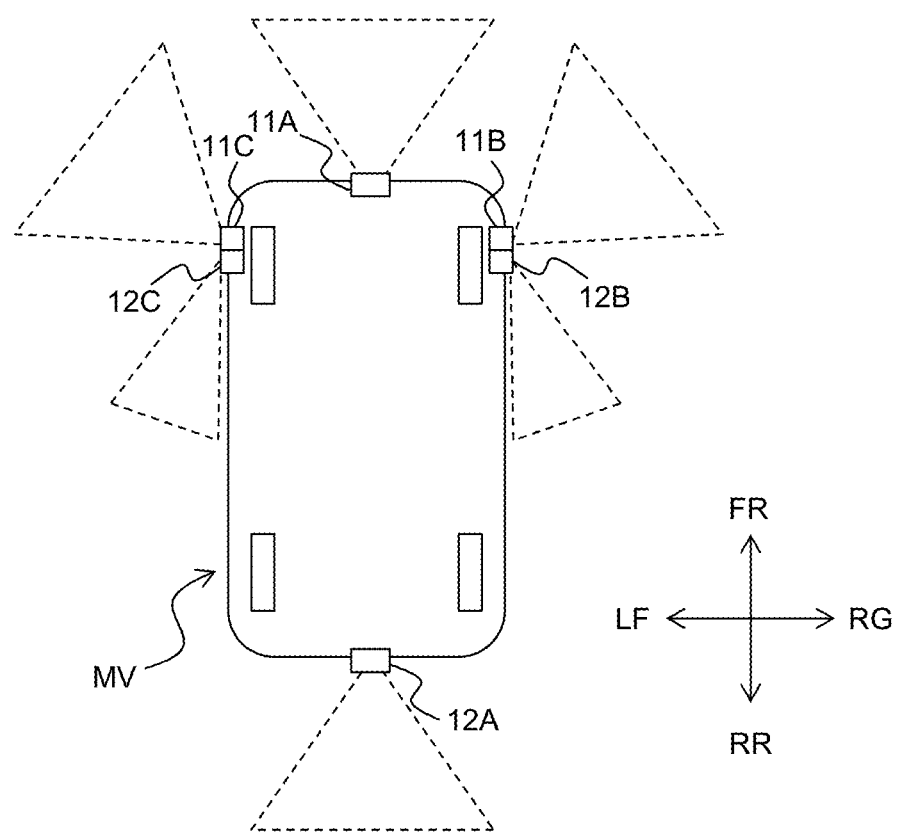
FIG. 4 is a diagram for explaining examples of a main camera and a sub camera.

Regions indicated by broken lines in FIG. 4 correspond to respective ranges in which those cameras capture images. In the example illustrated in FIG. 4, the main camera 11A captures an image of a front center of the moving body MV. The main camera 11B captures an image of front right of the moving body MV. The main camera 11C captures an image of front left of the moving body MV. The sub camera 12A captures an image of rear of the moving body MV. The sub camera 12B captures images of a right side and right rear of the moving body MV. The sub camera 12C captures images of a left side and left rear of the moving body MV.

For example, one main camera 11 is combined with one sub camera 12. In the example illustrated in FIG. 4, the main camera 11A is combined with the sub camera 12A. Further, the main camera 11B is combined with the sub camera 12B, and the main camera 11C is combined with the sub camera 12C.

Returning to FIG. 3, the description about the configuration example of the processing system will be continued. The communication device 13 executes wireless communication with a base station (not illustrated) on a network. As a communication standard of this wireless communication, a standard of mobile communication such as 4G, LTE, or 5G may be raised as an example. Connection destinations of the communication device 13 include at least the second terminal 2. In communication with the second terminal 2, the communication device 13 transmits at least the composite image data IMG_C to the second terminal 2. The communication device 13 may transmit ID data and present position data of the first terminal 1 (or the moving body MV) to the second terminal 2.

The data processing device 14 is a computer which executes data processing based on various kinds of data provided to the first terminal 1 and various kinds of data obtained by the first terminal 1. The data processing device 14 includes at least one processor 14a and at least one memory 14b. The processor 14a includes a central processing unit (CPU). The memory 14b is a volatile memory such as a DDR memory, expands various programs to be used by the processor 14a, and temporarily saves various kinds of data. The various kinds of data include the main image data IMG_M, the sub image data IMG_S, and the composite image data IMG_C.

The processor 14a executes a predetermined program for data processing, which is stored in the memory 14b, and thereby executes various kinds of data processing. The various kinds of data processing include "data synthesizing processing" for generating the composite image data IMG_C and "data transmission processing" for transmitting the composite image data IMG_C to the second terminal 2 via the communication device 13. Details of the data synthesizing processing and the data transmission processing will be described later.

Figure 5:
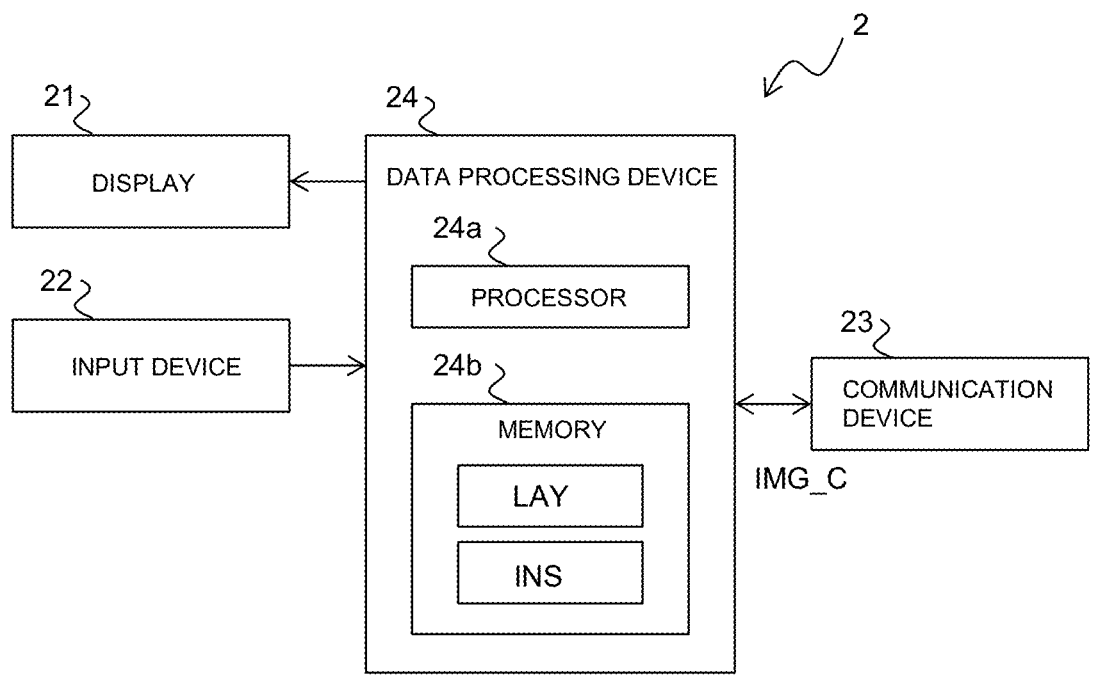
FIG. 5 is a block diagram illustrating a configuration example of a second terminal in the first embodiment.

FIG. 5 is a block diagram illustrating a configuration example of the second terminal 2 in the first embodiment. As illustrated in FIG. 5, the second terminal 2 includes the display 21, an input device 22, a communication device 23, and a data processing device 24. Configuration elements such as the display 21 are connected with the data processing device 24 by a predetermined network.

The display 21 displays the composite image data IMG_C received from the first terminal 1. When the first terminal 1 is a terminal mounted on the moving body MV illustrated in FIG. 4, the second terminal 2 is a terminal for executing remote assistance for the moving body MV, for example, and the composite image data IMG_C displayed on the display 21 are monitored by an operator who executes the remote assistance.

Here, as the remote assistance by the operator, recognition assistance and decision assistance may be raised as example. For example, when the moving body MV executes autonomous driving, when sunlight shines on a traffic light present in front of the moving body MV, precision of recognition of a lighting state of light emitting units of the traffic light is lowered. When the lighting state cannot be recognized, it becomes difficult to decide what kind of behavior has to be executed at which timing. In such a case, recognition assistance about the lighting state and/or decision assistance about behavior of the moving body MV are executed, the decision assistance being based on the lighting state recognized by the operator.

The remote assistance by the operator also includes remote driving. In the remote driving, the operator recognizes the composite image data IMG_C displayed on the display 21 and executes a driving operation of the moving body MV which includes at least one of steering, acceleration, and deceleration.

The input device 22 is operated by a user of the second terminal 2. The input device 22 includes an input unit which is operated by the user and a control circuit which generates and outputs instruction data INS based on input data, for example. As input units, a mouse, a keyboard, a button, and a switch may be raised as examples. As the instruction data INS, data for changing (such as enlarging and shrinking) display forms of the composite image data IMG_C on the display 21, data for changing settings of the display regions of the main screen 21M and the sub-screen 21S, and so forth may be raised as examples.

When the second terminal 2 executes the remote assistance for the moving body MV, the input device 22 is operated by the operator. In this case, the instruction data INS may be transmitted to the first terminal 1. When the operator executes remote driving of the moving body MV, the input device 22 may include input devices for traveling. As the input devices for traveling, a steering wheel, a shift lever, an accelerator pedal, and a brake pedal may be raised as examples. When the input devices for traveling are operated by the operator, the instruction data INS are transmitted to the first terminal 1.

The communication device 23 executes wireless communication with a base station on a network. As a communication standard of this wireless communication, a standard of mobile communication such as 4G, LTE, or 5G may be raised as an example. Connection destinations of the communication device 23 include at least the first terminal 1. In communication with the first terminal 1, the communication device 23 transmits data (hereinafter, also referred to as "layout data") LAY about layout of the display 21 to the first terminal 1. As the layout data LAY, data about sizes of the display 21 in horizontal and vertical directions, data about sizes of the display region of the sub-screen 21S in the horizontal and vertical directions, and data of the position of the display region may be raised as examples. When the second terminal 2 executes the remote assistance for the moving body MV, the communication device 23 may transmit the instruction data INS to the first terminal 1.

The data processing device 24 is a computer which executes data processing based on various kinds of data provided to the second terminal 2 and various kinds of data obtained by the second terminal 2. The data processing device 24 includes at least one processor 24a and at least one memory 24b. The processor 24a includes a CPU. The memory 24b is a volatile memory such as a DDR memory, expands various programs to be used by the processor 24a, and temporarily saves various kinds of data. The various kinds of data include the layout data LAY and the instruction data INS.

The processor 24a executes a predetermined program for data processing, which is stored in the memory 24b, and thereby executes various kinds of data processing. The various kinds of data processing include "display control processing" for displaying the composite image data IMG_C received from the first terminal 1 on the display 21. Details of the display control processing will be described later.

1-2-2. Data Processing Example

Figure 6:
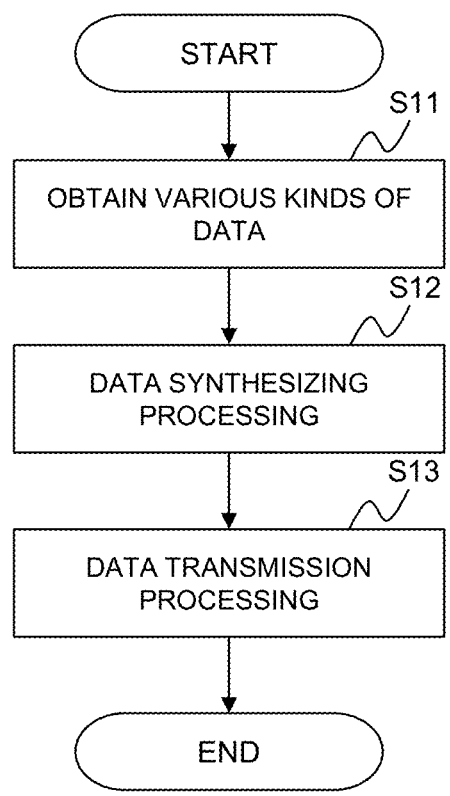
FIG. 6 is a flowchart illustrating a flow of a data processing example to be executed by a data processing device of the first terminal in the first embodiment.

FIG. 6 is a flowchart illustrating a flow of a data processing example which is executed in the data processing device 14 (processor 14a). A routine illustrated in FIG. 6 is repeatedly executed in a predetermined cycle (for example, a reception interval of the main image data IMG_M).

In the routine illustrated in FIG. 6, various kinds of data are first obtained (step S11). The various kinds of data include the main image data IMG_M and the sub image data IMG_S which are obtained at the same time. The various kinds of data also include the layout data LAY received from the second terminal 2.

Following the processing in step S11, the data synthesizing processing is executed (step S12). The data synthesizing processing is executed based on the main image data IMG_M, the sub image data IMG_S, and the layout data LAY which are obtained in step S11.

Figure 7:
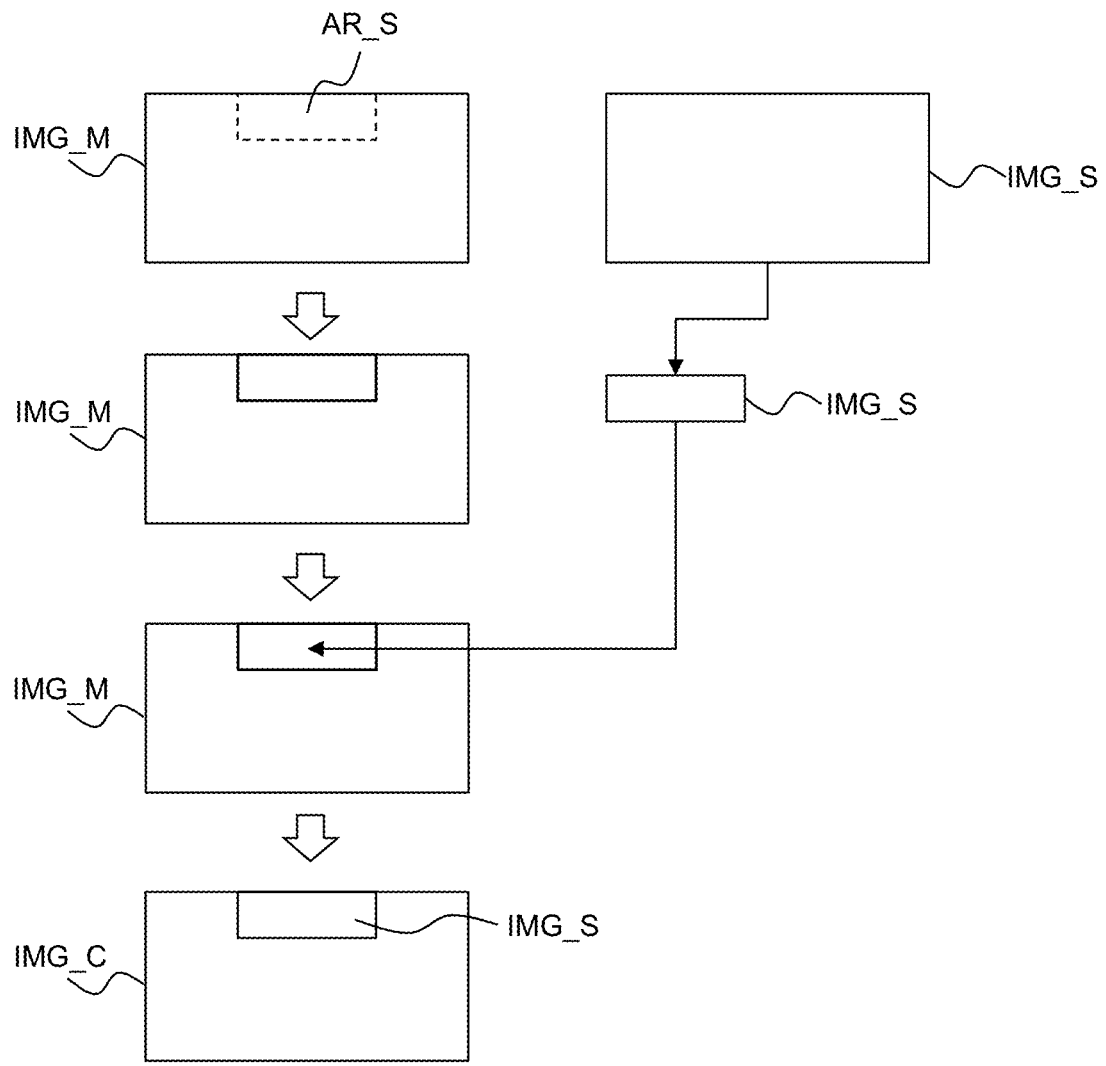
FIG. 7 is a diagram for explaining one example of a data synthesizing processing which is executed in the first embodiment.

FIG. 7 is a diagram for explaining one example of the data synthesizing processing. In the example illustrated in FIG. 7, based on the layout data LAY, size and position of a display region AR_S, to which the sub image data IMG_S are planned to be joined, are first specified. In the example illustrated in FIG. 7, the display region AR_S is positioned in an upper center of the main image data IMG_M.

In the example illustrated in FIG. 7, next, image data in the main image which correspond to the position of the display region AR_S are deleted. This deletion processing contributes to reduction in a data amount of the main image data IMG_M. Further, in parallel with this deletion processing, adjustment of the sub image data IMG_S obtained at the same time as the main image data IMG_M is executed. In the example illustrated in FIG. 7, the size of the sub image data IMG_S is shrunk so as to conform to the size of the display region AR_S. This shrinking process contributes to reduction in a data amount of the sub image data IMG_S. After the shrinking process, image data of an outer periphery portion of the sub image data IMG_S may be deleted so as to conform to the size of the display region AR_S.

In the example illustrated in FIG. 7, next, the adjusted sub image data IMG_S are joined (inserted) to a position in the upper center of the main image data IMG_M (in other words, the position of the display region AR_S). Accordingly, the composite image data IMG_C are generated.

Returning to FIG. 6, following the processing in step S12, the data transmission processing is executed (step S13). In the data transmission processing, encoding processing of the composite image data IMG_C is executed, and the composite image data IMG_C are output to the communication device 13. In the encoding processing, the composite image data IMG_C may be compressed. The composite image data IMG_C output to the communication device 13 are transmitted from the first terminal 1 to the second terminal 2.

Figure 8:
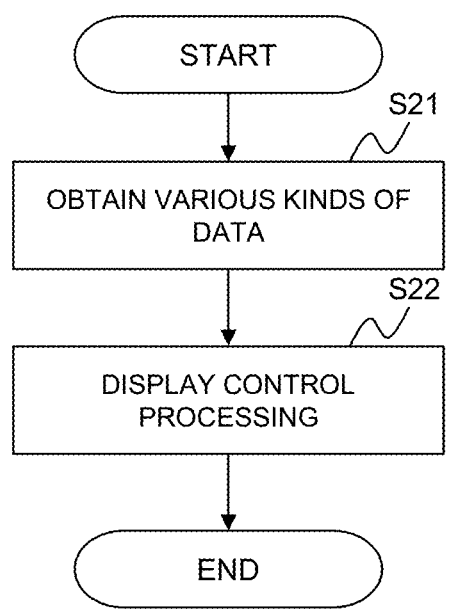
FIG. 8 is a flowchart illustrating a flow of a data processing example to be executed by a data processing device of the second terminal in the first embodiment.

FIG. 8 is a flowchart illustrating a flow of a data processing example which is executed in the data processing device 24 (processor 24a). A routine illustrated in FIG. 8 is repeatedly executed in a predetermined cycle (for example, a reception interval of the composite image data IMG_C).

In the routine illustrated in FIG. 8, various kinds of data are first obtained (step S21). The various kinds of data include the composite image data IMG_C received from the first terminal 1.

Following the processing in step S21, the display control processing is executed (step S22). In the display control processing, decoding processing of the composite image data IMG_C obtained in step S21 is executed, and the composite image data IMG_C are output to the display 21. When the composite image data IMG_C are compressed, the data are decompressed in the decoding process.

1-3. Effects

In the above-described first embodiment, the processing (data synthesizing processing) to synthesize the main image data IMG_M with the sub image data IMG_S is executed in the first terminal 1, and thereafter the transmission processing (data transmission processing) to transmit the composite image data IMG_C to the second terminal 2 is executed. Consequently, compared to a case where the main image data IMG_M and the sub image data IMG_S are transmitted to the second terminal 2 without any change, it becomes possible to reduce the data amount of image data to be transmitted from the first terminal 1 to the second terminal 2.

In particular, when the remote assistance for the moving body MV is executed, images of a periphery of the moving body MV have to be captured by plural cameras, and the data amount of the image data to be transmitted from the first terminal 1 to the second terminal 2 tends to become large. When the data amount of the image data to be transmitted becomes large, transmission at a designated frame rate becomes difficult, and there is a concern that trouble occurs such as an increase in communication delay and an occurrence of communication disruption. In this point, in the first embodiment, because it becomes possible to inhibit an occurrence of such trouble, contribution to smooth practice of the remote assistance is expected.

2. Second Embodiment

A second embodiment of the present disclosure will be described with reference to FIGS. 9 and 10. Note that in the following, descriptions about contents common to the first embodiment will appropriately be skipped.

2-1. Outline of Second Embodiment

Figure 9:
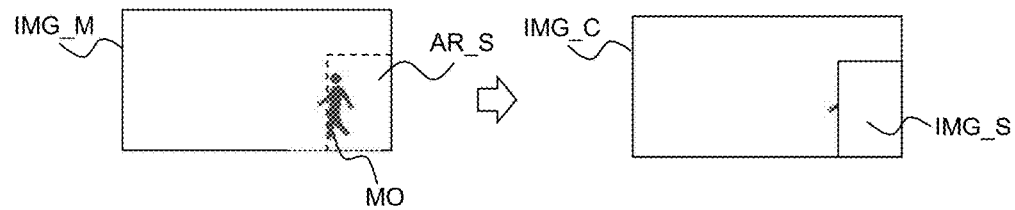
FIG. 9 is a diagram for explaining an outline of a processing example of image data which is executed in a second embodiment of the present disclosure.
Figure 9:
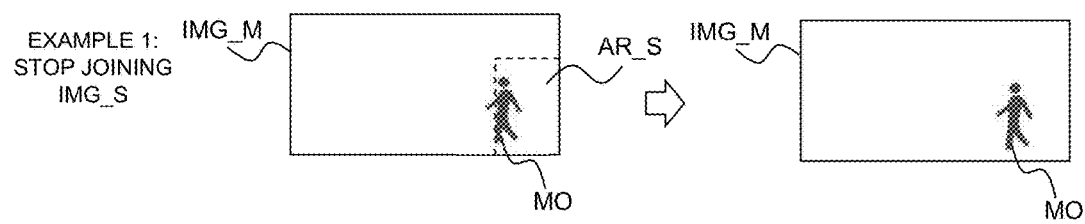
Figure 9:
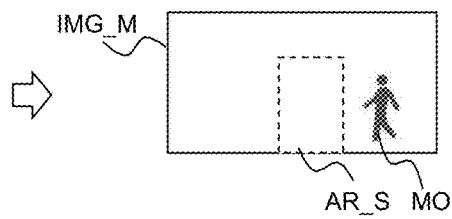
Figure 9:
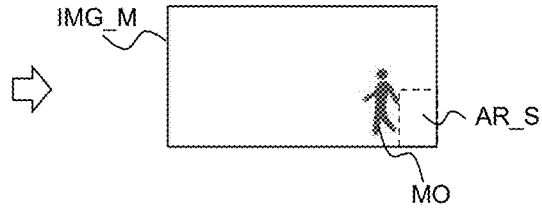

FIG. 9 is a diagram for explaining an outline of a processing example of image data which is executed in the second embodiment. Note that in an upper stage of FIG. 9, the processing example of the first embodiment which is compared to the processing example of the second embodiment is illustrated.

In the processing example of the second embodiment, the composite image data IMG_C are generated by compositing together the main image data IMG_M and the sub image data IMG_S which are obtained at the same time. Further, in the processing example in the second embodiment, the sub image data IMG_S whose size and so forth are adjusted are joined (inserted) to the position of the display region AR_S in the main image. To this point, the processing example is the same as the processing example of the first embodiment.

The processing example of the first embodiment is on the presumption that the position of the display region AR_S is fixed. Thus, there is a problem that when an object is present in the position of the display region AR_S, image data of a part or the whole of the object disappear from the composite image data IMG_C. As illustrated in the upper stage of FIG. 9, when a dynamic object MO (for example, a moving body such as a pedestrian, a bicycle, a motorcycle, or a vehicle) is present in the position of the display region AR_S, a large part of an image of the dynamic object MO does not appear on the composite image.

Such a situation is not desirable for the user of the second terminal 2 who checks and observes presence of the dynamic object MO in a periphery of the first terminal 1 by using the composite image data IMG_C. When the remote assistance for the moving body MV is executed by using the composite image data IMG_C, in view of securing traveling safety of the moving body MV, falling into such a situation has to be avoided.

Accordingly, in the processing example of the second embodiment, before the composite image data IMG_C are generated, an object which appears in the main image is recognized by using the main image data IMG_M. Then, when the dynamic object MO is recognized in the position of the display region AR_S, data processing (data adjustment processing) for visualizing the dynamic object MO is executed.

In a lower stage of FIG. 9, an example of the data adjustment processing is illustrated. In a first example, joining of the sub image data IMG_S to the position of the display region AR_S is stopped. In this case, the composite image data IMG_C are configured only with the main image data IMG_M.

In a second example, the position of the display region AR_S is changed. In the second example, the display region AR_S which has already been changed is positioned on a left side of the display region AR_S which has not yet been changed. However, the changed position of the display region AR_S is not particularly limited as long as the position is a position in which the dynamic object MO is not present, and the display region AR_S can be moved in an arbitrary direction of up, down, left, or right. The second example may be combined with the data adjustment (stop of joining) described in the first example.

In a third example, the size of the display region AR_S is shrunk. For example, a reference point (for example, the center of gravity of a quadrangular region or a left lower or right lower apex) in the display region AR_S is fixed, and the size of the display region AR_S is repeatedly shrunk until the dynamic object MO comes out from the position of the shrunk display region AR_S. The third example may be combined with the data adjustment (stop of joining) described in the first example. The third example may also be combined with the data adjustment (change in position) described in the second example.

When the data adjustment processing is executed, it becomes possible to avoid trouble that a part or the whole of the image of the dynamic object MO does not appear on the composite image. This leads to enhancement of visibility of the dynamic object MO by using the composite image data IMG_C and also to enhancement of traveling safety of the moving body MV by using the composite image data IMG_C.

In the following, a description will be made about a processing system according to the second embodiment. Note that a configuration example of the processing system is common to the configuration example described in the first embodiment. Thus, in the following, an example of data processing by the processing system will be described.

2-2. Data Processing Example

Figure 10:
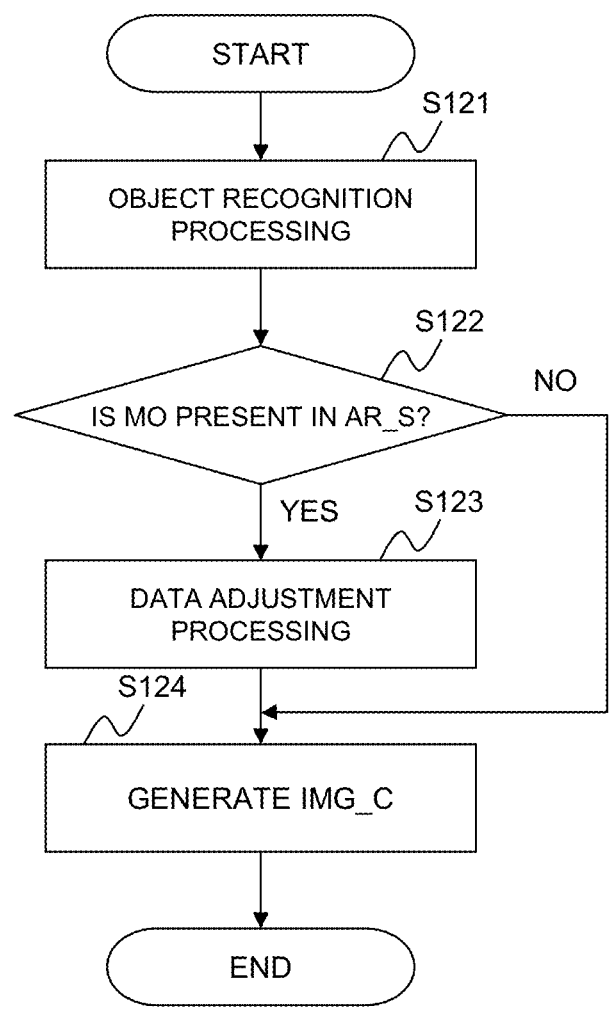
FIG. 10 is a flowchart illustrating a flow of a data processing example to be executed by the data processing device of the first terminal in the second embodiment.

FIG. 10 is a flowchart illustrating a flow of a data processing example which is executed in the data processing device 14 (processor 14*a*). A routine illustrated in FIG. 10 is executed as a subroutine of step S12 illustrated in FIG. 6, for example.

In the routine illustrated in FIG. 10, an object recognition processing is first executed (step S121). In the object recognition processing, based on the main image data IMG_M, an object in a periphery of the main camera 11, whose image is captured by the main camera 11, is recognized. As an object to be recognized, in addition to the dynamic object MO, a static object may be raised as an example. As static objects, a construction, a building, and so forth which are present in the periphery of the main camera 11 may be raised as examples. When the main camera 11 is mounted on the moving body MV, as the static objects, a line demarcating a lane on which the moving body MV is presently traveling, a guardrail, a traffic signal, and so forth may be raised as examples.

Following the processing in step S121, it is determined whether or not the dynamic object MO is present in the position of the display region AR_S (step S122). The position of the display region AR_S is specified based on the layout data LAY received from the second terminal 2. Thus, when the dynamic object MO is recognized in the processing in step S121, a positional relationship between the position of the image of the dynamic object MO in the main image and the position of the display region AR_S is calculated. For example, several representative positions of the image of the dynamic object MO are specified. Then, it is determined whether or not all of the representative positions are on the inside of the display region AR_S. When it is determined that all of the representative positions are on the inside of the display region AR_S, it is determined that the dynamic object MO is present in the position of the display region AR_S.

When an affirmative determination result is obtained in step S122, the data adjustment processing is executed (step S123). As already described, the data adjustment processing is data processing for visualizing the dynamic object MO present in the position of the display region AR_S. In the first example of the data adjustment processing, joining of the sub image data IMG_S to the position of the display region AR_S is stopped.

In the second example of the data adjustment processing, the position of the display region AR_S is changed. In this case, it is determined whether or not the dynamic object MO (or another dynamic object MO) is present in the position of the display region AR_S whose position has already been changed, the display region AR_S is moved to a position in which the dynamic object MO (or another dynamic object MO) is not present. When even when movement of the display region AR_S is repeated, the dynamic object MO (or another dynamic object MO) is present in the position of the display region AR_S at a movement destination, joining of the sub image data IMG_S may be stopped.

In the third example of the data adjustment processing, the size of the display region AR_S is shrunk. In this case, it is determined whether or not the dynamic object MO (or another dynamic object MO) is present in the position of the display region AR_S whose size has already been changed, the size of the display region AR_S is shrunk until the dynamic object MO (or another dynamic object MO) comes out from the position of the display region AR_S whose size has already been changed. When the size of the display region AR_S becomes less than a threshold value as a result of repetition of shrinking of the display region AR_S, joining of the sub image data IMG_S may be stopped.

In a fourth example of the data adjustment processing, change in the position of the display region AR_S and shrinking of the size are executed in combination. When even when change in the position and the size is repeated, the dynamic object MO (or another dynamic object MO) is present in the position of the display region AR_S which has already been changed, joining itself of the sub image data IMG_S may be stopped. Also when the size of the display region AR_S whose position and size have already been changed becomes less than a threshold value, joining of the sub image data IMG_S may be stopped.

When a negative determination result is obtained in step S122 or after the processing in step S123, the composite image data IMG_C are generated (step S124). When a negative determination result is obtained in step S122, the composite image data IMG_C are generated in accordance with the processing example described in FIG. 7. When the position of the display region AR_S is changed, the sub image data IMG_S whose size has already been adjusted are joined (inserted) to the position of the display region AR_S whose position has already been changed. When the size of the display region AR_S is shrunk, the size of the sub image data IMG_S is shrunk so as to conform to the size of the display region AR_S whose size has already been changed. Subsequently, the sub image data IMG_S whose size has already been adjusted are joined (inserted) to the position of the display region AR_S whose size has already been changed. When joining of the sub image data IMG_S is stopped, the composite image data IMG_C are generated only from the main image data IMG_M.

2-3. Effects

In the above-described second embodiment, the data adjustment processing is executed. The data adjustment processing makes it possible to avoid trouble that a part or the whole of the image of the dynamic object MO does not appear on the composite image. This leads to enhancement of visibility of the dynamic object MO by using the composite image data IMG_C and also to enhancement of traveling safety of the moving body MV by using the composite image data IMG_C.

3. Third Embodiment

A third embodiment of the present disclosure will be described with reference to FIGS. 11 to 15. Note that in the following, descriptions about contents common to the first or second embodiment will appropriately be skipped.

3-1. Outline of Third Embodiment

Figure 11:
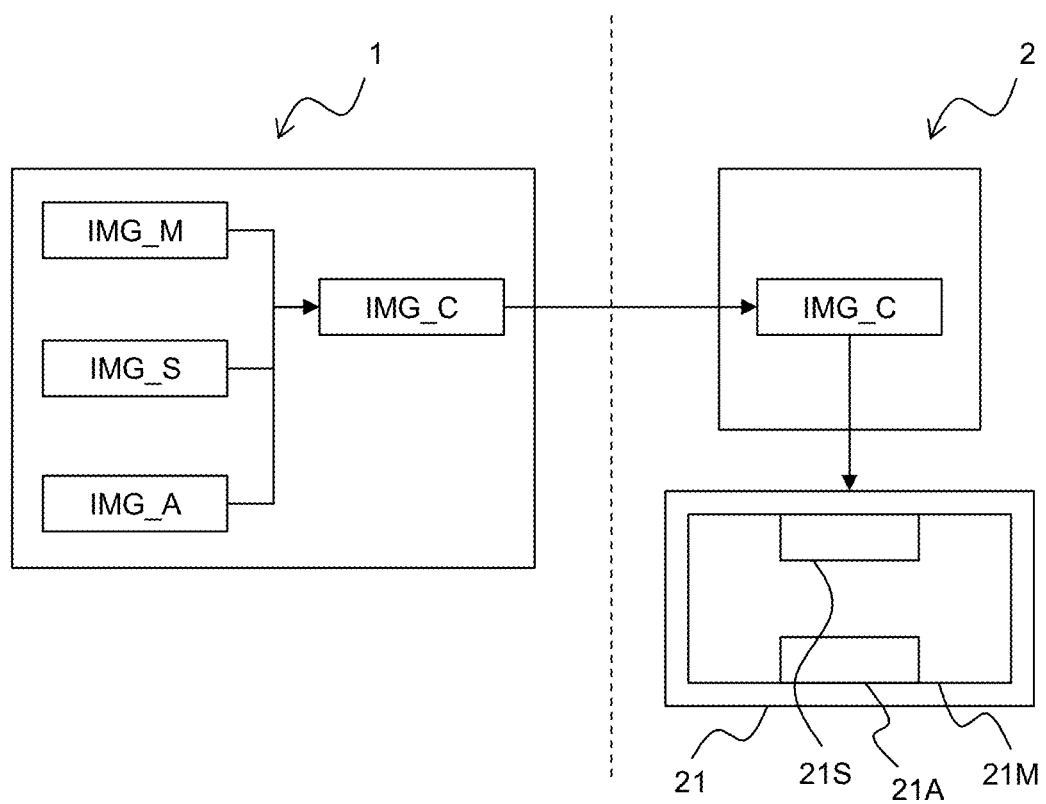
FIG. 11 is a diagram for explaining an outline of a processing example of image data which is executed in a third embodiment of the present disclosure.

FIG. 11 is a diagram for explaining an outline of a processing example of image data which is executed in the third embodiment. FIG. 11 illustrates the composite image data IMG_C. The composite image data IMG_C are data to be transmitted from the first terminal 1 to the second terminal 2. The composite image data IMG_C include image data that can be obtained by compositing together the main image data IMG_M and the sub image data IMG_S which are obtained at the same time.

The composite image data IMG_C transmitted from the first terminal 1 to the second terminal 2 are displayed on the display 21 of the second terminal 2. In the display region of the sub-screen 21S, image data corresponding to the sub image data IMG_S of the composite image data IMG_C are displayed. To this point, the processing example is the same as the processing example of the first embodiment.

Differently from the processing example of the first embodiment, in the processing example of the third embodiment, the composite image data IMG_C are composited from the main image data IMG_M, the sub image data IMG_S, and additional image data IMG_A which are obtained at the same time. The additional image data IMG_A are image data which are set while being associated with a moving situation of the first terminal 1. The additional image data IMG_A are generated based on the data about the moving situation of the first terminal 1.

Further, in the processing example of the third embodiment, the display 21 includes a display region of an augmented reality information screen 21A in addition to the display regions of the main screen 21M and the sub-screen 21S. In other words, the display region of the main screen 21M of the third embodiment is decreased by the amount of the display region of the augmented reality information screen 21A compared to the display region of the main screen 21M in the first embodiment. In the display region of the augmented reality information screen 21A, image data corresponding to the additional image data IMG_A of the composite image data IMG_C are displayed. In the display region of the main screen 21M, image data are displayed in which the image data corresponding to the display regions of the sub-screen 21S and the augmented reality information screen 21A are removed from the main image data IMG_M of the composite image data IMG_C.

In such a manner, in the processing example of the third embodiment, the composite image data IMG_C including the additional image data IMG_A are generated in the first terminal 1 and transmitted to the second terminal 2. Consequently, when the augmented reality information is displayed on the display 21, it becomes possible to reduce the data amount to be transmitted from the first terminal 1 to the second terminal 2.

In the following, a description will be made about a processing system according to the third embodiment.

3-2. Processing System 3-2-1. Configuration Example

Figure 12:
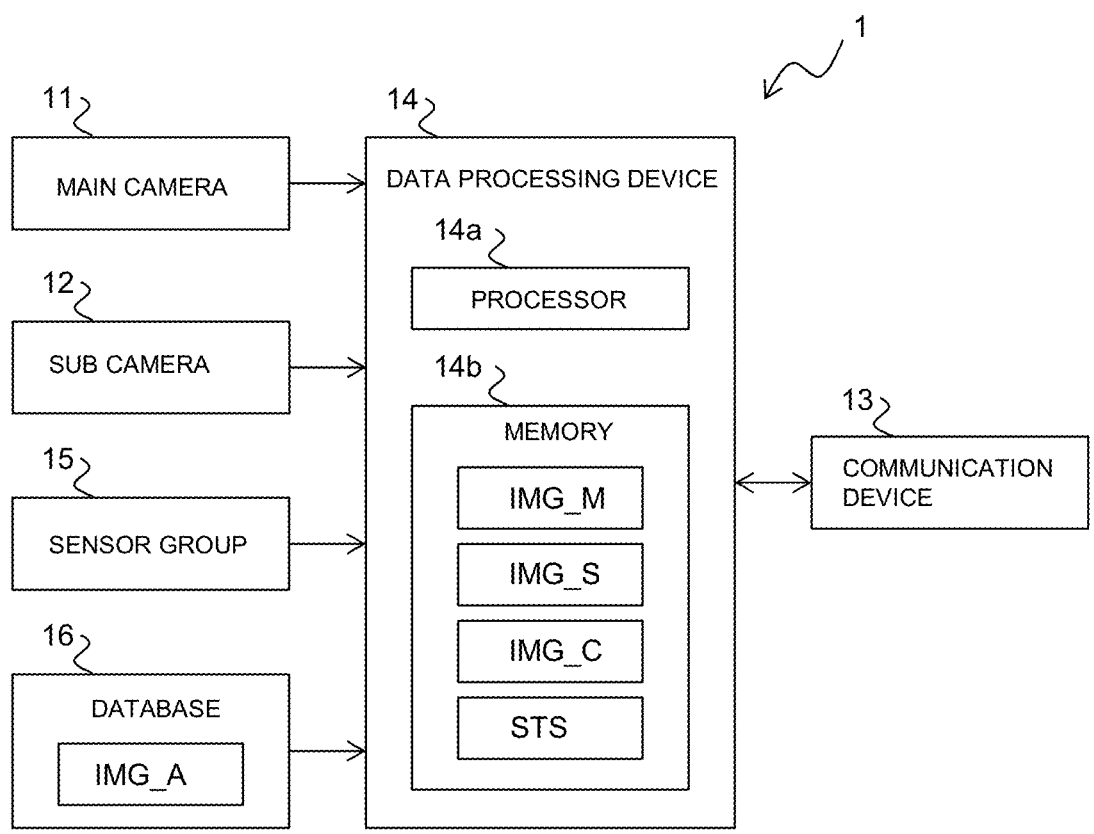
FIG. 12 is a block diagram illustrating a configuration example of the first terminal in the third embodiment.

FIG. 12 is a block diagram illustrating a configuration example of the first terminal 1 in the third embodiment. As illustrated in FIG. 12, the first terminal 1 includes the main camera 11, the sub camera 12, the communication device 13, the data processing device 14, a sensor group 15, and a data base 16. In other words, the configuration example illustrated in FIG. 12 is a configuration example in which the sensor group 15 and the data base 16 are added to the configuration example in the first embodiment which is described in FIG. 3. Configuration elements such as the main camera 11 are connected with the data processing device 14 by a predetermined network.

The sensor group 15 includes sensors which detect the moving situation of the first terminal 1. As the sensors which detect the moving situation, a speed sensor and an acceleration sensor may be raised as examples. The speed sensor detects a speed of the first terminal 1. The acceleration sensor detects an acceleration of the first terminal 1. The sensors which detect the moving situation also include a position sensor. The position sensor detects the position and a bearing of the first terminal 1. As the position sensor, a global navigation satellite system (GNSS) sensor may be raised as an example. Various kinds of moving situation data STS detected by those sensors are transmitted to the data processing device 14.

When the first terminal 1 is a terminal mounted on the moving body MV illustrated in FIG. 4, the sensors which detect the moving situation may include a yaw rate sensor and a steering angle sensor in addition to the speed sensor and the acceleration sensor. In this case, the yaw rate sensor detects a yaw rate around a perpendicular axis of the center of gravity of the moving body MV. The steering angle sensor detects an angle of a steering wheel of the moving body MV. When the first terminal 1 is a terminal mounted on the moving body MV illustrated in FIG. 4, the sensor group 15 may also include recognition sensors other than the main camera 11 and the sub camera 12. A recognition sensor recognizes an ambient environment of the moving body MV by using an electric wave or light. As the recognition sensors, a millimeter-wave radar and laser imaging, detection, and ranging (LIDAR) may be raised as examples.

The data base 16 stores various kinds of data necessary for generation of the additional image data IMG_A. The various kinds of data, speed image data, acceleration image data, and map image data may be raised as examples. Generation of the additional image data IMG_A by using the speed image data is executed by referring to the moving situation data STS (for example, the speed of the first terminal 1). Generation of the additional image data IMG_A by using the acceleration image data is executed by referring to the moving situation data STS (for example, the acceleration of the first terminal 1). Generation of the additional image data IMG_A by using the map image data is executed by referring to the moving situation data STS (for example, the position of the first terminal 1).

When the first terminal 1 is a terminal mounted on the moving body MV illustrated in FIG. 4, various kinds of data to be stored in the data base 16 include image data which indicate a future traveling track of the moving body MV. Generation of the additional image data IMG_A by using track image data is executed by predicting the future traveling track of the moving body MV based on the moving situation data STS (for example, the speed and steering angle of the moving body MV) and by extracting the track image data closest to the shape of the traveling track from the data base 16.

A configuration example of the second terminal 2 in the third embodiment is the same as the configuration example in the first embodiment which is described in FIG. 5.

3-2-2. Data Processing Example

Figure 13:
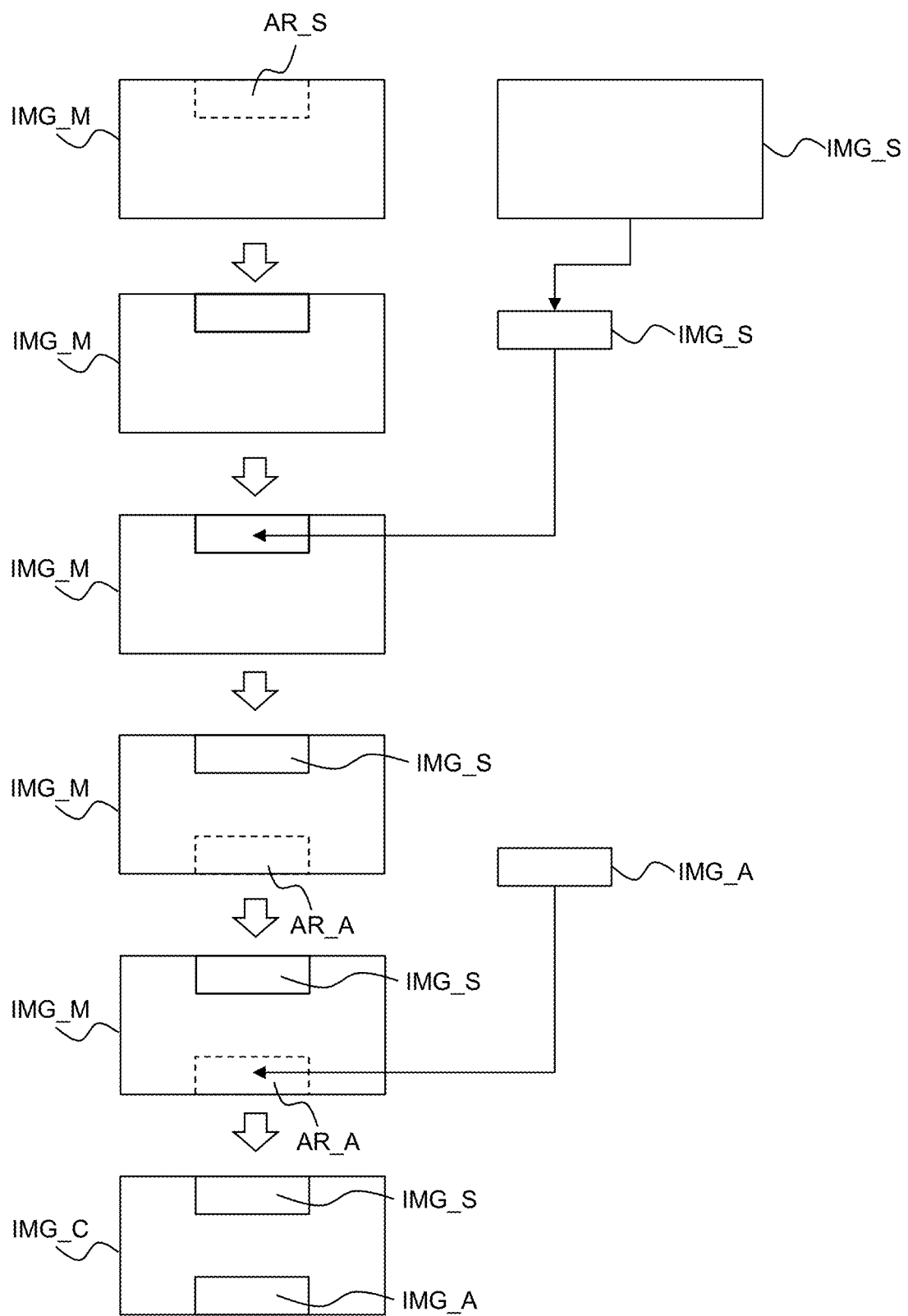
FIG. 13 is a diagram for explaining one example of a data synthesizing processing which is executed in the third embodiment.

A processing example of image data in the third embodiment is basically the same as the processing example in the first embodiment which is described in FIGS. 6 to 8. FIG. 13 is a diagram for explaining one example of a data synthesizing processing which is executed in the third embodiment. The data synthesizing processing illustrated in FIG. 13 is executed in step S12 in FIG. 6, for example.

In the example illustrated in FIG. 13, based on the layout data LAY, size and position of a display region AR_S, to which the sub image data IMG_S are planned to be joined, are first specified. Further, image data in the main image which correspond to the position of the display region AR_S are deleted. Further, in parallel with this deletion processing, adjustment of the sub image data IMG_S obtained at the same time as the main image data IMG_M is executed. Then, the adjusted sub image data IMG_S are joined (inserted) to the position of the specified display region AR_S. To this point, the processing example is the same as the processing example described in FIG. 7.

In the example illustrated in FIG. 13, next, a display region AR_A to which the additional image data IMG_A are planned to be joined is specified. The display region AR_A is specified in a region, from which the display region AR_S to which the sub image data IMG_S are joined is removed. Then, the additional image data IMG_A are superimposed on the position of the specified display region AR_A.

3-3. Display Examples of Composite Image Data

Figure 14:
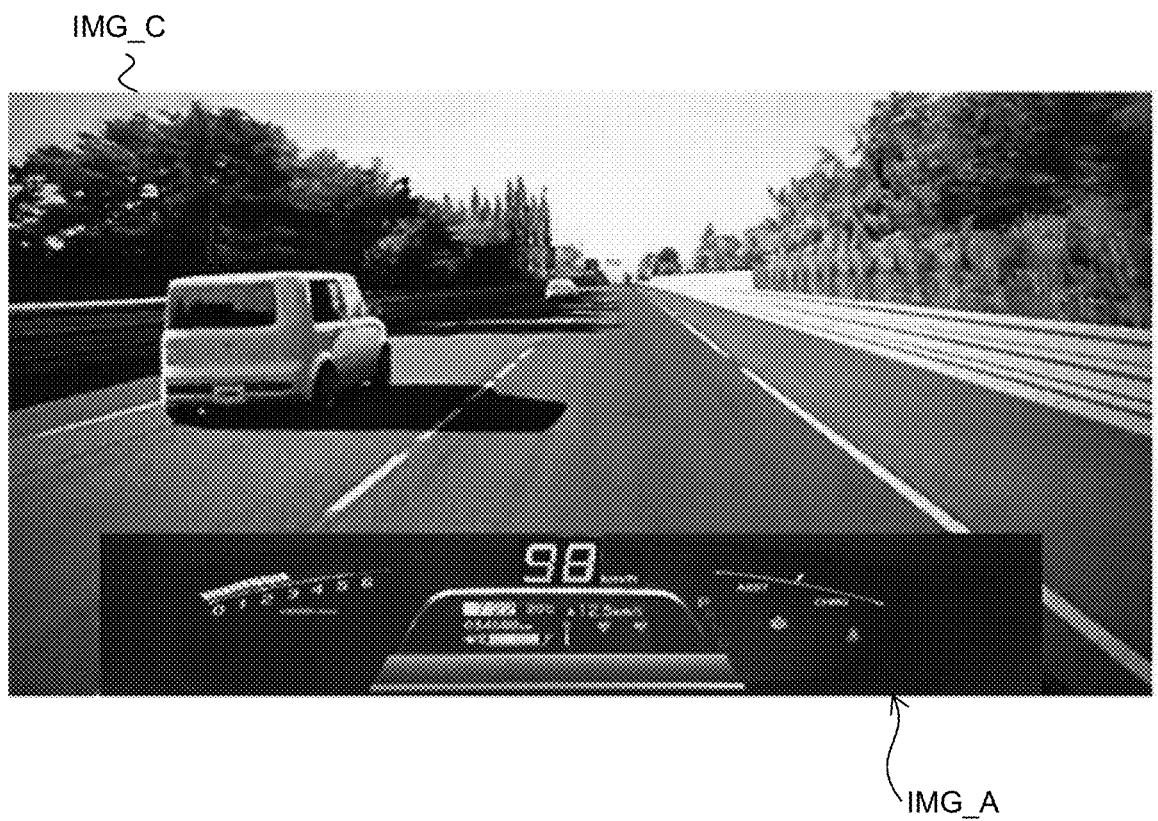
FIG. 14 is a diagram illustrating a display example of composite image data to be displayed on a display when a display control processing is executed in the second terminal.
Figure 15:
FIG. 15 is a diagram illustrating another display example of the composite image data to be displayed on the display when the display control processing is executed in the second terminal.

FIGS. 14 and 15 are diagrams illustrating display examples of the composite image data IMG_C to be displayed on the display 21 when the display control processing is executed in the second terminal 2. Note that FIGS. 14 and 15 illustrate examples of the composite image data IMG_C when the second terminal 2 is a terminal for executing the remote assistance for the moving body MV. Further, FIGS. 14 and 15 do not illustrate display of the sub-screen 21S.

In the example illustrated in FIG. 14, in the position of the display region AR_A, the composite image data IMG_C to which the additional image data IMG_A are joined are displayed, the additional image data IMG_A corresponding to the moving situation data STS of the moving body MV such as a speed and an engine rotation speed. Meanwhile, in the example illustrated in FIG. 15, the composite image data IMG_C are displayed in which the additional image data IMG_A for guiding parking of the moving body MV are superimposed on the main image data IMG_M.

3-4. Effects

In the above-described third embodiment, the composite image data IMG_C including the additional image data IMG_A are generated in the first terminal 1 and transmitted to the second terminal 2. Consequently, when the augmented reality information is displayed on the display 21, it becomes possible to reduce the data amount to be transmitted from the first terminal 1 to the second terminal 2.

What is claimed is:

1. An image data processing system causing image data transmitted from a first terminal to a second terminal via a network to be displayed on a display of the second terminal,
   wherein the first terminal includes a data processing device and a communication device which communicates with the second terminal,
   wherein the data processing device of the first terminal includes a processor and a memory which stores main image data which are obtained by a main camera and are to be displayed on a main screen of the display and sub image data which are obtained by a sub camera and are to be displayed on a sub-screen of the display,
   wherein the second terminal includes a data processing device and a communication device which communicates with the first terminal,
   wherein the data processing device of the second terminal includes a processor and a memory which stores data about layout of a screen of the second terminal,
   wherein the processor of the first terminal is configured to:
   execute a data synthesizing processing to generate composite image data, in which the main and sub image data are composited together, based on the main and sub image data and the data about the layout which are received from the second terminal; and a data transmission processing to transmit the composite image data to the second terminal, wherein the processor of the second terminal is configured to execute display control processing to display on the display the composite image data received from the first terminal, wherein the processor of the first terminal is further configured to execute object recognition processing to recognize an object in a periphery of the first terminal based on the main image data, wherein, in the data synthesizing processing, the processor of the first terminal is further configured to:
determine whether or not a dynamic object recognized in the object recognition processing is positioned in a predetermined region in a main image to which the sub image data are planned to be joined; and
execute data adjustment processing to visualize the dynamic object when it is determined that the dynamic object is positioned in the predetermined region, and wherein the data adjustment processing includes a stop of joining of the sub image data, change in a position of the predetermined region, and shrinking of a size of the predetermined region.

2. The image data processing system according to claim 1,
wherein the first terminal further includes a data base that stores additional image data which are set while being associated with a moving situation of the first terminal,
wherein the memory of the first terminal further stores data about the moving situation,
wherein, in the data synthesizing processing, the processor of the first terminal is further configured to:
extract the additional image data corresponding to the moving situation by referring to the data base based on the data about the moving situation; and
superimpose the additional image data corresponding to the moving situation on the main image data.

3. The image data processing system according to claim 2,
wherein, in the data synthesizing processing, the processor of the first terminal is configured to superimpose the additional image data on a region other than a predetermined region in a main image to which the sub image data are planned to be joined.

4. The image data processing system according to claim 1, wherein:
the first terminal is a terminal of a moving body on which the main and sub cameras are mounted; and
the second terminal is a terminal for performing remote assistance for the moving body.

5. An image data processing method of causing image data transmitted from a first terminal to a second terminal via a network to be displayed on a display of the second terminal, the method comprising the steps of:
the first terminal generating composite image data, in which main and sub image data are composited together, based on the main image data which are obtained by a main camera and are to be displayed on a main screen of the display, the sub image data which are obtained by a sub camera and are to be displayed on a sub-screen of the display, and data about layout of a screen of the second terminal;
the first terminal transmitting the composite image data to the second terminal;
the second terminal displaying the composite image data received from the first terminal on the display;
the first terminal recognizing an object in a periphery of the first terminal based on the main image data;
the first terminal determining whether or not a dynamic object recognized in the step of recognizing an object in the periphery of the first terminal is positioned in a predetermined region in a main image to which the sub image data are planned to be joined; and
the first terminal executing data adjustment processing to not synthesize the sub image data with the predetermined region when it is determined that the dynamic object is positioned in the predetermined region,
wherein the data adjustment processing includes a stop of joining of the sub image data, change in a position of the predetermined region, and shrinking of a size of the predetermined region.

6. The method according to claim 5, wherein:
the first terminal is a terminal of a moving body on which the main and sub cameras are mounted; and
the second terminal is a terminal for performing remote assistance for the moving body.

* * * * *